United States Patent [19]
Shima

[11] Patent Number: 5,459,817
[45] Date of Patent: Oct. 17, 1995

[54] NEURAL NETWORK WITH LEARNING FUNCTION BASED ON SIMULATED ANNEALING AND MONTE-CARLO METHOD

[75] Inventor: Takeshi Shima, Kanagawa, Japan

[73] Assignee: Kabushiki Kaisha Toshiba, Kawasaki, Japan

[21] Appl. No.: 38,100

[22] Filed: Mar. 30, 1993

[30] Foreign Application Priority Data

Mar. 30, 1992 [JP] Japan ................ 4-074488

[51] Int. Cl.⁶ ........................................ G06F 1/00
[52] U.S. Cl. ................................. 395/23; 395/24
[58] Field of Search ...................... 395/22, 23, 24, 395/27

[56] References Cited

U.S. PATENT DOCUMENTS

| | | | |
|---|---|---|---|
| 3,601,811 | 8/1971 | Yoshino | 395/27 |
| 4,874,963 | 10/1989 | Alspector | 395/24 |
| 4,933,871 | 6/1990 | DeSieno | 395/23 |
| 5,134,685 | 7/1992 | Rosenbluth | 395/23 |
| 5,148,514 | 9/1992 | Arima et al. | 395/24 |
| 5,153,923 | 10/1992 | Matsuba et al. | 382/14 |
| 5,195,169 | 3/1993 | Kamiya et al. | 395/23 |
| 5,214,746 | 5/1993 | Fogel et al. | 395/23 |
| 5,220,496 | 6/1993 | Tanaka et al. | 395/22 |
| 5,220,641 | 6/1993 | Shima et al. | 395/24 |
| 5,247,583 | 9/1993 | Kato et al. | 382/9 |
| 5,253,327 | 10/1993 | Yoshihara | 395/24 |
| 5,303,328 | 4/1994 | Masui et al. | 395/22 |

OTHER PUBLICATIONS

Matsuba, "Optimal Simulated Annealing Method and Its Application to Combinatorial Problems", Int'l Joint Conf on Neural Networks, Jun. 18–22, 1989, vol. 1 pp. 541–546.
Blake et al., "Visual Reconstruction," pp. 126–127 (1987).
Wong et al., "Simulated Annealing for VLSI Design," pp. 1–7 (1988).

*Primary Examiner*—Robert W. Downs
*Attorney, Agent, or Firm*—Foley & Lardner

[57] ABSTRACT

A neural network with a learning function which does not require the backward propagation of the signals for the learning, which is applicable for a case involving the feedback of the synapses or the loop formed by the synapses, and which enables the construction of a large scale neural network by using compact and inexpensive circuit elements. An evaluation value is calculated according to a difference between each output signal of the network and a corresponding teacher signal; a manner of updating the synapse weight factor of each synapse is determined according to an evaluation value change between a present value and a previous value of evaluation value on a basis of the simulated annealing; a randomly changing update control signal is generated according to a random number; and a synapse weight factor of each synapse is updated according to the generated update control signal and the determined manner of updating on a basis of the Monte-Carlo method.

20 Claims, 10 Drawing Sheets

NEURAL NETWORK WITH LEARNING FUNCTION BASED ON SIMULATED ANNEALING AND MONTE-CARLO METHOD

BACKGROUND OF THE INVENTION

1. Field of the Invention

The present invention relates to a neural network which is widely utilized in various applications such as letter recognition, speech recognition, robot motion control, process control in general, and neuro-computers.

2. Description of the Background Art

The backward error propagation scheme is a very well known conventional mechanism for the learning of a multi-layer perceptron, for which much researches have been reported. The actual implementation of the neural network using this scheme has developed significantly. This backward error propagation scheme will be briefly outlined.

A conceptual configuration of a conventional neural network in a three-layer configuration is shown in FIG. 1, which generally comprises an input layer 1, an intermediate layer 2, and an output layer 3. In this neural network, a plurality of neurons are inter-connected through a plurality of synapse connections. In this configuration, learning is realized by comparing a teacher signal [t] with an output [O] outputted from the neuron of the output layer 3 in response to the input of an input pattern [X] entered from the neuron of the input layer 1.

For a certain neuron j, let an input of this neuron j be denoted as $net_{pj}$, where a suffix $p$ indicates that the input is the p-th input pattern [Xp]. Then, this $net_{pj}$ can be expressed by the following equation (1).

$$net_{pj} = \sum_i \omega_{ij} O_{pi} \tag{1}$$

where $\omega_{ij}$ is a transmission efficiency of a synapse connection connecting the neuron i and the neuron j.

Next, let an input and output function of the neuron j be denoted as $f_j$. Then, the output $O_{pj}$ of this neuron j in response to the p-th input pattern [Xp] can be expressed by the following equation (2).

$$O_{pj} = f_j(net_{pj}) \tag{2}$$

In this case, the evaluation value $E_p$ can be defined by the following equation (3).

$$E_p = \frac{1}{2} \cdot \sum_j |t_{pj} - O_{pj}|^2 \tag{3}$$

where $t_{pj}$ is a desired output of the neuron j. In other words, this evaluation value $E_p$ reflects the difference between the actual output and the desired output, so that it is desirable to minimize this evaluation value.

In order to minimize this evaluation value $E_p$ of the equation (3) by using the steepest descent method, it is known that a partial derivative of $E_p$ with respect to $\omega_{ij}$ should be used as an update value $\Delta_p \omega_{ij}$ for the synapse transmission efficiency $\omega_{ij}$. Consequently, it is known that the update value $\Delta_p \omega_{ij}$ for the synapse transmission efficiency can be expressed by the following equation (4).

$$\Delta_p \omega_{ij} = \eta \delta_{pj} O_{pj} \tag{4}$$

where $\eta$ is a relaxation coefficient and $\delta_{pj}$ is given by the following equation (5) when the neuron j belongs to the output layer 3, $$\delta_{pj} = (t_{pj} - O_{pj}) f_j'(net_{pj}) \tag{5}$$

and otherwise $\delta_{pj}$ is given by the following equation (6).

$$\delta_{pj} = f_j'(net_{pj}) \sum_k \delta_{pk} \omega_{kj} \tag{6}$$

where ' denotes a derivative.

This manner of updating the synapse transmission efficiency according to the equation (4) has been known as the backward error propagation algorithm.

When this backward error propagation algorithm is applied to the neural network, as shown in FIG. 2, the input pattern [X] is entered into the neuron of the input layer 1, and propagated to the neuron of the intermediate layer 2 and the neuron of the output layer 3 through synapse connections, and the output [O] is outputted from the neuron of the output layer 3. On the other hand, the teacher signal [t] and this output [O] are compared at the neuron of the output layer 3 to obtain an error signal to be propagated through the neurons of each layer in a backward direction with respect to the propagation of the input, while updating the synapse transmission efficiency at each neuron according to the equation (4), so as to reduce the error of the output with respect to the teacher signal sequentially.

This process is called learning. Thus, in the backward error propagation scheme, it is necessary to provide a path for propagating the signal to be utilized in the learning process backwards, from the output side to the input side.

Now, this learning mechanism based on the backward error propagation scheme is known to work effectively in the computer simulation. However, the actual implementation of this learning mechanism by dedicated hardware has encountered various difficulties.

For example, in order to realize this learning mechanism based on the backward error propagation scheme in a large scale neural network by using a compact and inexpensive analog circuits, it becomes necessary to construct circuitry for carrying out the procedures described above by combining various circuit elements, such as multipliers and adders. However, in such a construction, the inevitable processing error introduced by the analog circuit for calculating the solution to the above equation (4) can severely deteriorate the performance of the neural network as a whole.

In addition, the backward error propagation scheme requires very high level precision in each neuron and each synapse for the backward propagation of the error signal, in order to achieve the effective learning, so that the very expensive, high precision circuit elements must be used for neurons and synapses, and even when such expensive circuit elements are used, there still remains a possibility for the performance of the neural network to be affected by offsets and variations among the circuit elements.

Moreover, there are cases in which it is quite difficult to obtain the truly optimum solution (absolute minimum) in the backward error propagation scheme using the steepest descent method.

Furthermore, the backward error propagation scheme is applicable only to the network having a multi-layer structure as shown in FIGS. 1 and 2. Consequently, there has been no known method for appropriately adjusting the synapse transmission efficiency for a case involving the feedback of the synapses or the loop formed by the synapses.

SUMMARY OF THE INVENTION

It is therefore an object of the present invention to provide a neural network with a learning function which does not require the backward propagation of the signals for learning.

It is another object of the present invention to provide a learning function for a neural network which is applicable for a case involving feedback of the synapses or the loop formed by the synapses.

It is another object of the present invention to provide a learning function for a neural network which enables the construction of a large scale neural network by using compact and inexpensive circuit elements.

According to one aspect of the present invention, there is provided a neural network device with a learning function, comprising: a network formed by a plurality of neurons inter-connected by a plurality of synapses, each synapse having its own synapse weight factor; comparison means for calculating an evaluation value according to a difference between each output signal of the network and a corresponding teacher signal; and inspection means for determining a manner of updating the synapse weight factor of said each synapse according to an evaluation value change between a present value and a previous value of the evaluation value calculated by the comparison means; wherein said each synapse having: random number generation means for generating a randomly changing update control signal according to a random number; and synapse weight factor update means for updating a synapse weight factor of said each synapse as a learning according to the update control signal generated by the random number generation means and the manner of updating determined by the inspection means.

According to another aspect of the present invention there is provided a method of learning in a neural network formed by a plurality of neurons inter-connected by a plurality of synapses, each synapse having its own synapse weight factor, comprising the steps of: calculating an evaluation value according to a difference between each output signal of the network and a corresponding teacher signal; determining a manner of updating the synapse weight factor of said each synapse according to an evaluation value change between a present value and a previous value of the evaluation value calculated at the calculating step; generating a randomly changing update control signal according to a random number; and updating a synapse weight factor of said each synapse according to the update control signal generated at generating step and the manner of updating determined at the determining step.

Other features and advantages of the present invention will become apparent from the following description taken in conjunction with the accompanying drawings.

DETAILED DESCRIPTION OF THE PREFERRED EMBODIMENTS

Figure 1:
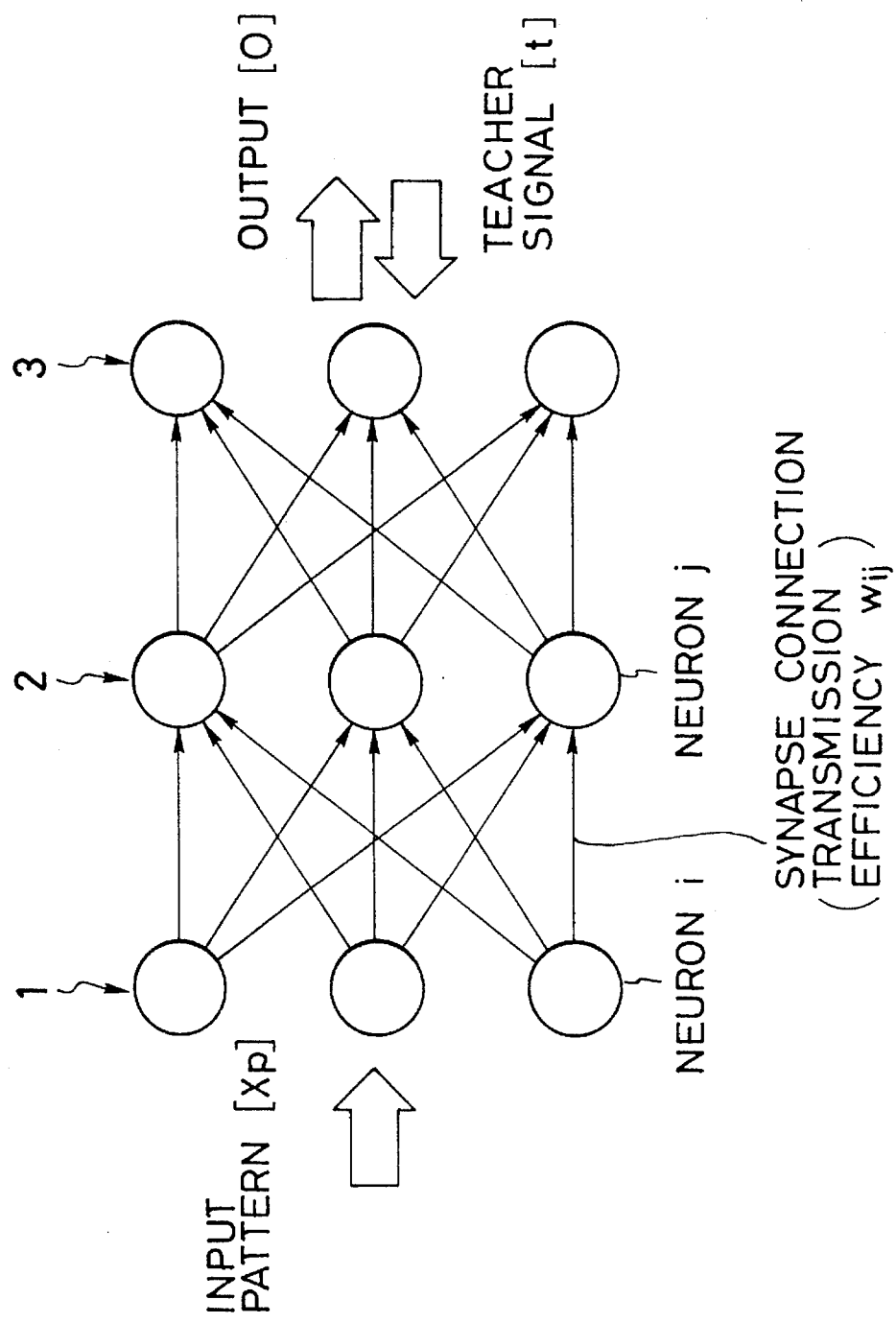
FIG. 1 is a conceptual block diagram of a conventional three layer type neural network for explaining its basic operation.
Figure 2:
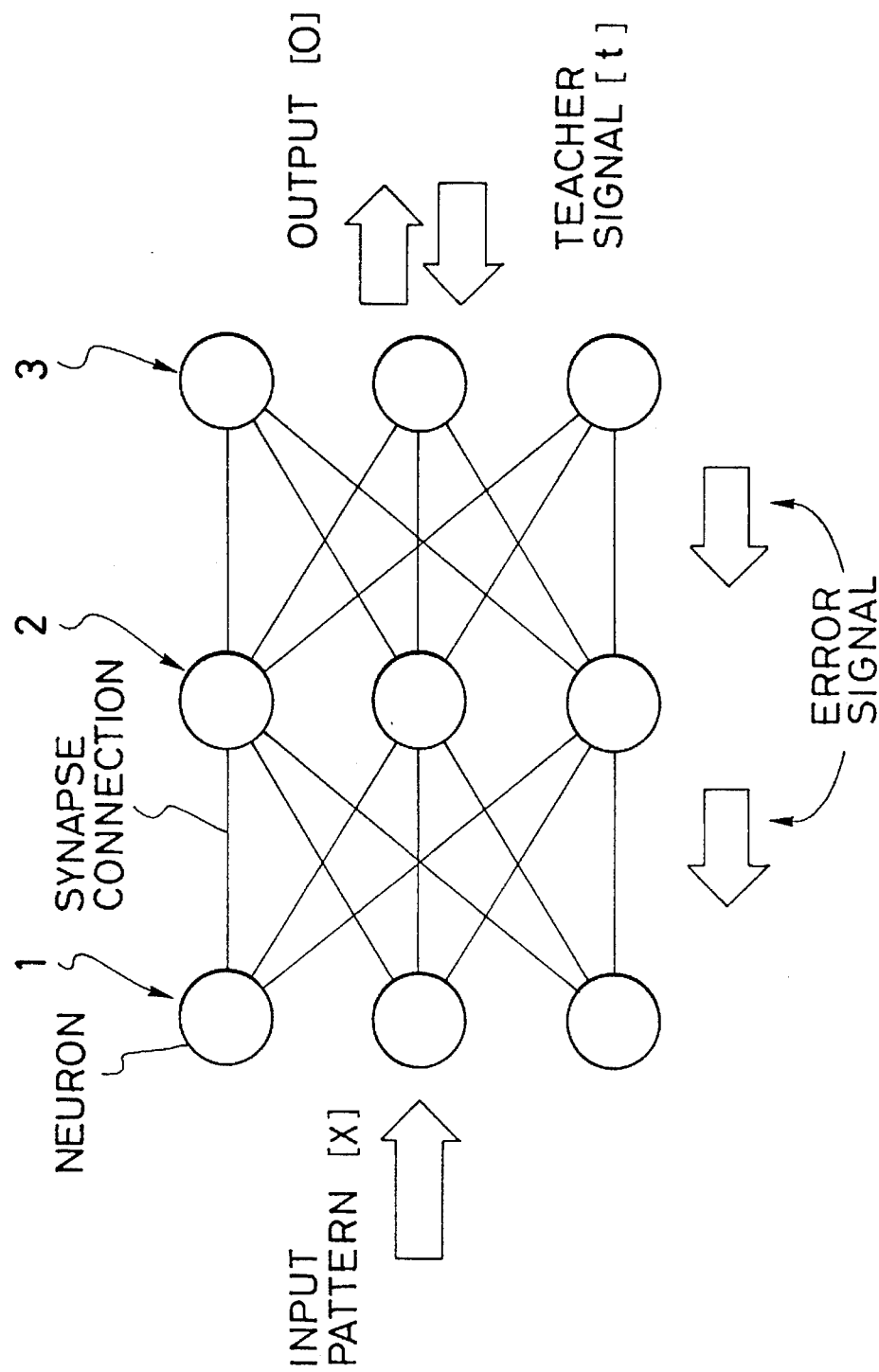
FIG. 2 is a conceptual block diagram of a conventional three layer type neural network for explaining the learning mechanism based on the backward error propagation scheme.
Figure 3:
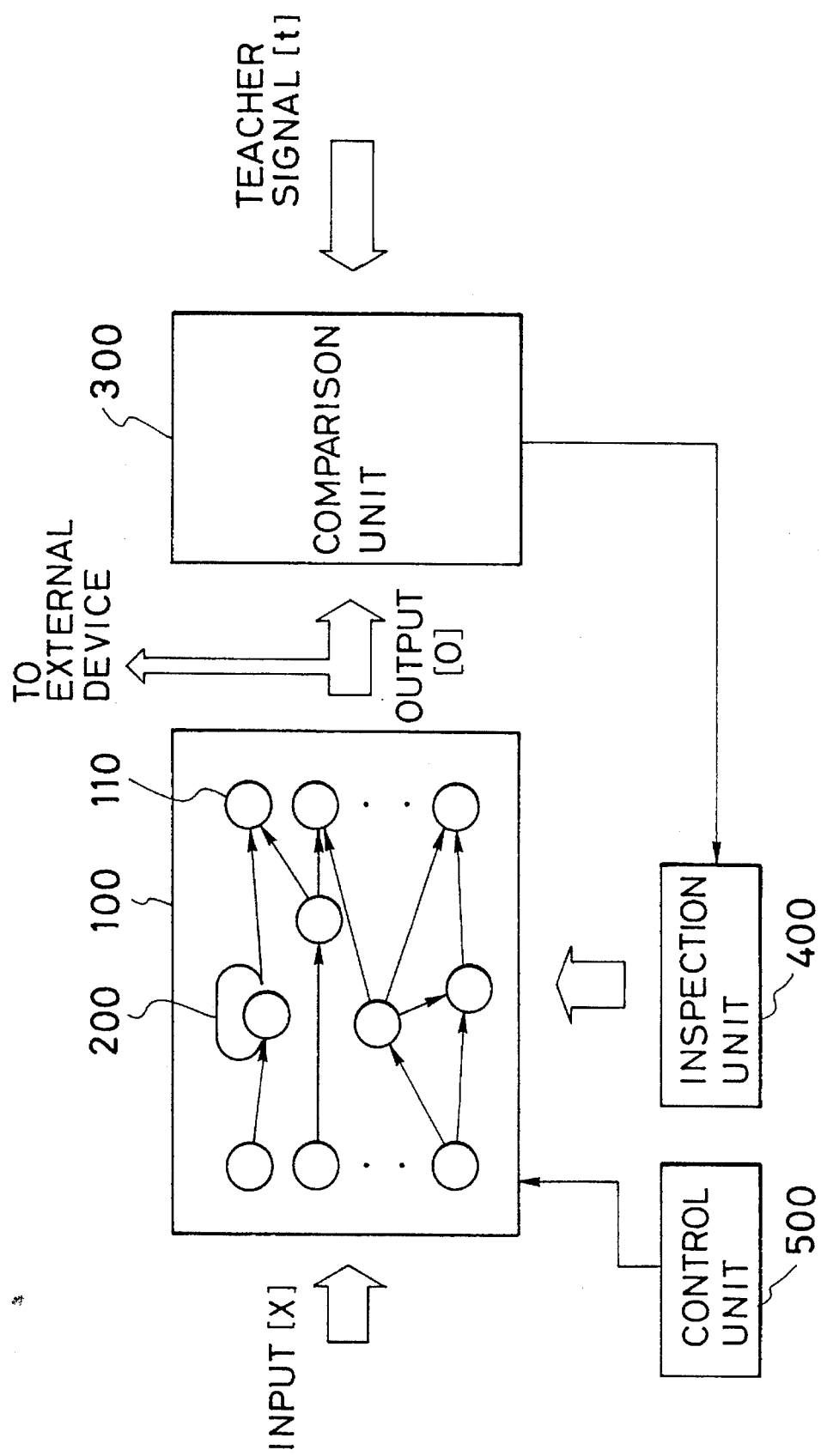
FIG. 3 is a schematic block diagram of one embodiment of a neural network device according to the present invention.

Referring now to FIG. 3, one embodiment of a neural network device according to the present invention will be described in detail.

In this embodiment, the neural network device comprises: a network 100 formed by a plurality of neurons 110 inter-connected by a plurality of synapses 200; a comparison unit 300 for comparing an output signal [O] of the neural network 100 in response to an input signal [X] with a teacher signal [t] to obtain an evaluation value; an inspection unit 400 for determining whether or not to update the transmission efficiency at the synapses 200; and a control unit 500 for supplying control signals to the synapses 200 of the network 100.

In this embodiment, the transmission efficiency at each synapse is used as a synapse weight factor to be updated.

As indicated in FIG. 3, the output signal [O] of the network 100 is outputted not only to the comparison unit 300, but also to an external device (not shown).

Here, the notation of the input signal $[X]=(x_1, x_2, \ldots, x_m)$, the teacher signal $[t]=(t_1, t_2, \ldots, t_n)$, and the output signal $[O]=(O_1, O_2, \ldots, O_n)$ will be used below.

In this embodiment, the evaluation value is defined by either one of the following equations (7) and (8).

$$E = \sum_i |t_i - O_i| \tag{7}$$

$$E = \sum_i (t_i - O_i)^2 \tag{8}$$

In general, the evaluation value in this embodiment can be expresses as the following equation (9).

$$E = \sum_i g(t_i - O_i) \tag{9}$$

where g is a function which is minimum when $(t_i-O_i)=0$, monotonically increasing when $t_i-O_i>0$, and monotonically decreasing when $t_i-O_i<0$.

Figure 4:
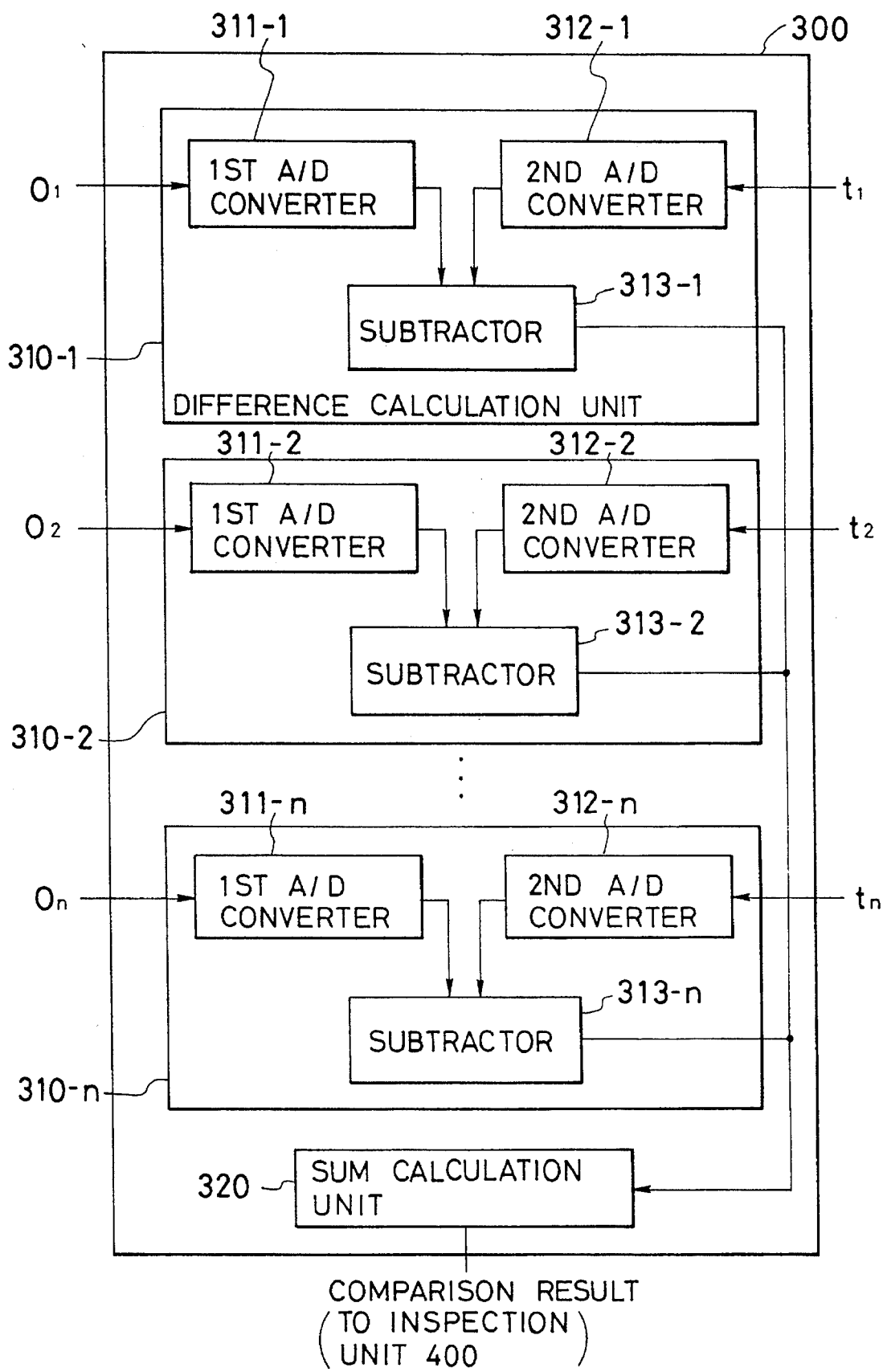
FIG. 4 is a detailed block diagram of a comparison unit in the neural network device of FIG. 3.

Referring now to FIG. 4, a detailed configuration of the comparison unit 300 will be described.

As shown in FIG. 4, the comparison unit 300 further comprises: as many difference calculation units 310-1 to 310-n as a number of neuron (n in this embodiment) in the network 100, and a sum calculation unit 320. Each difference calculation unit 310-i (i=1 to n) contains a first A/D converter 311-i for A/D converting the i-th output signal $O_i$, a second A/D converter 312-i for A/D converting the i-th teacher signal $t_i$, and a subtractor 313-i for calculating a difference $(t_i-O_i)$ between the A/D converted i-th output signal and the A/D converted i-th teacher signal. The sum calculation unit 820 calculates a sum $\Sigma |t_i-O_i|$ of the difference $(t_i-O_i)$ calculated by the difference calculation units 310-1 to 310-n, in a case of using the evaluation value E of the equation (7). The sum calculated by the sum calculation unit 820 is then outputted to the inspection unit 400 as the evaluation value E.

In this configuration of FIG. 4, the sum calculation unit 320 has a calculation precision equal to (1+ln 2n) x (a precision of each neuron output).

Here, each of the first A/D converter 311-i and the second A/D converter 312-i may be formed by a circuit for converting a voltage value into a charge amount. Also, in a case of using an analog subtractor for the subtractor 313-i, the first A/D converter 311-i and the second A/D converter 312-i will be unnecessary, and the circuit configuration of the comparison unit 300 can be simplified.

Figure 5:
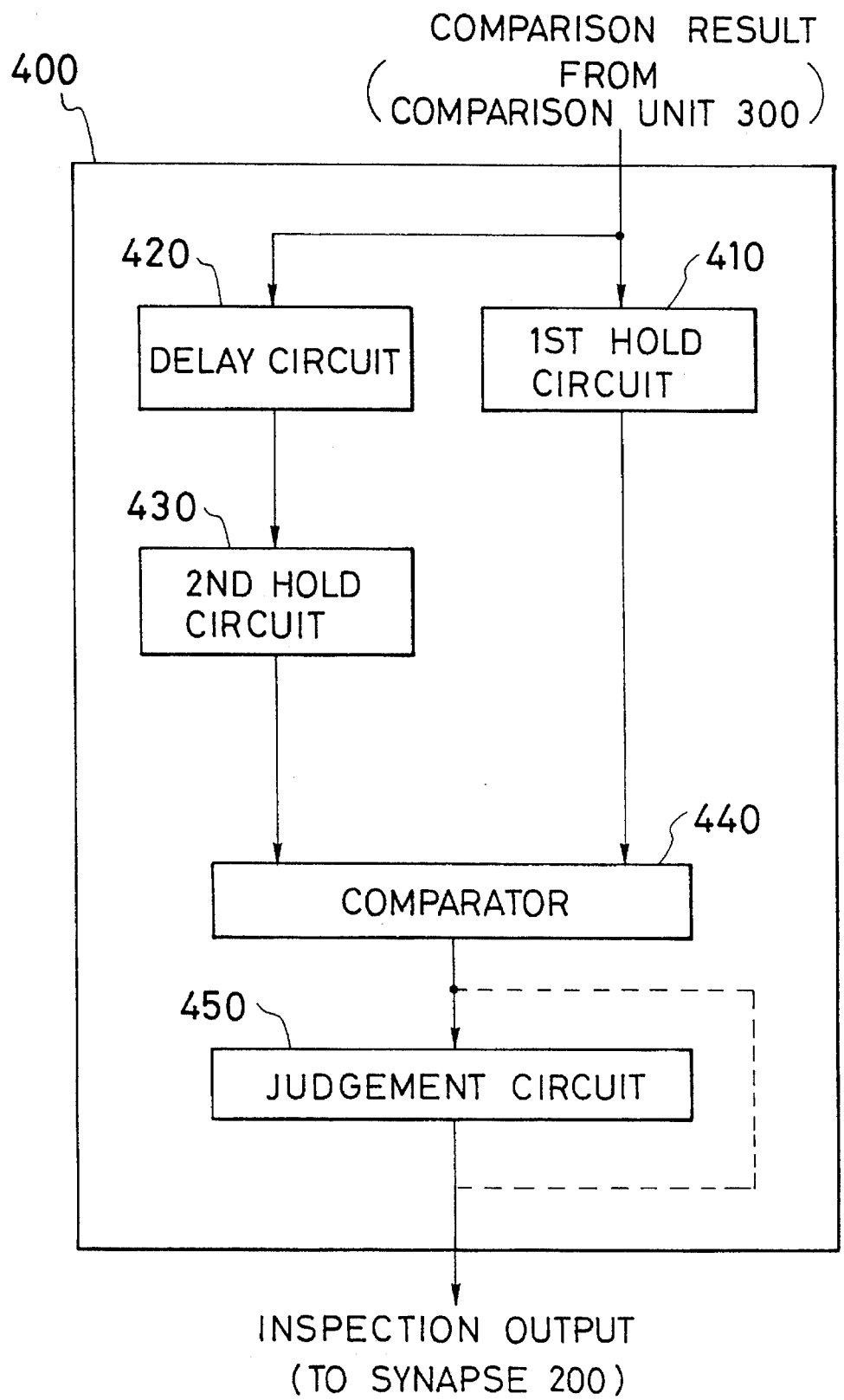
FIG. 5 is a detailed block diagram of an inspection unit in the neural network device of FIG. 3.

Referring now to FIG. 5, a detailed configuration of the inspection unit 400 will be described.

This inspection unit inspects whether the evaluation value E entered from the comparison unit 300 has increased or decreased compared with the previous evaluation value, and outputs an inspection output to each of the synapses 200.

As shown in FIG. 5, the inspection unit 400 further comprises: a first hold circuit 410 for holding the evaluation value E entering from the comparison unit 300; a delay circuit 420 for delaying the evaluation value E entering from the comparison unit 300; a second hold circuit 430 for holding the evaluation value E delayed by the delay circuit 420; a comparator 440 for comparing the evaluation values held by the first and second hold circuits 410 and 430; and a judgement circuit 450 for judging the acceptance of a comparison result obtained by the comparator 440 as the inspection output of the inspection unit 400.

In this inspection unit 400 of FIG. 5, the present evaluation value held by the first hold circuit 410 and the previous evaluation value held by the second hold circuit 430 are compared at the comparator 440, and the comparator 440 outputs a comparison result $\Delta E$ indicating whether the evaluation value has increased or decreased from the previous value to the present value. Here, the comparison result $\Delta E$ may be given as a logical value "0" when the evaluation value has increased, and as a logical value "1" when the evaluation value has decreased.

The judgement circuit 450 makes the judgement regarding the acceptance of the comparison result $\Delta E$ outputted from the comparator 440 as the inspection output of the inspection unit 400, by utilizing the technique of the simulated annealing as follows.

Namely, in this judgement circuit 450, according to the idea of the Boltzmann machine, a "temperature" variable $T(\tau)$ as a function of a discrete time ($\tau=0, 1, 2$, etc.) is defined by the following equation (10).

$$T(\tau) = \frac{T_0}{1+\ln(\tau)} \qquad (10)$$

where $T_0$ is a prescribed initial value. According to this equation (10), this "temperature" variable T gradually decreases as the discrete time $\tau$ progresses.

Then, the judgement circuit 450 rejects the comparison result $\Delta E$="0" indicating the increase of the evaluation value E only at a probability p defined by the following equation (11).

$$p = \exp\left(-\frac{\Delta E}{T}\right) \qquad (11)$$

When the comparison result $\Delta E$="0" is rejected, the inspection output of the inspection unit 400 is changed to "1", whereas when the comparison result $\Delta E$="0" is not rejected, the inspection output of the inspection unit 400 is "0" as obtained by the comparator 440. As for the comparison result $\Delta E$="1", the inspection output of the inspection unit 400 is always "1" as obtained by the comparator 440.

It is to be noted here that the comparison result $\Delta E$ obtained by the comparator 440 may be used directly as the inspection output of the inspection unit 400 by bypassing the judgement circuit 450 as indicated by the dashed line in FIG. 5, provided that evaluation value E as a function has a unique minimum. However, when this bypassing is adopted in a case the evaluation value E as a function has local minima along with an absolute minimum, only one of the local minima of the evaluation value E can be found, so that the simulated annealing cannot be achieved effectively.

Figure 6:
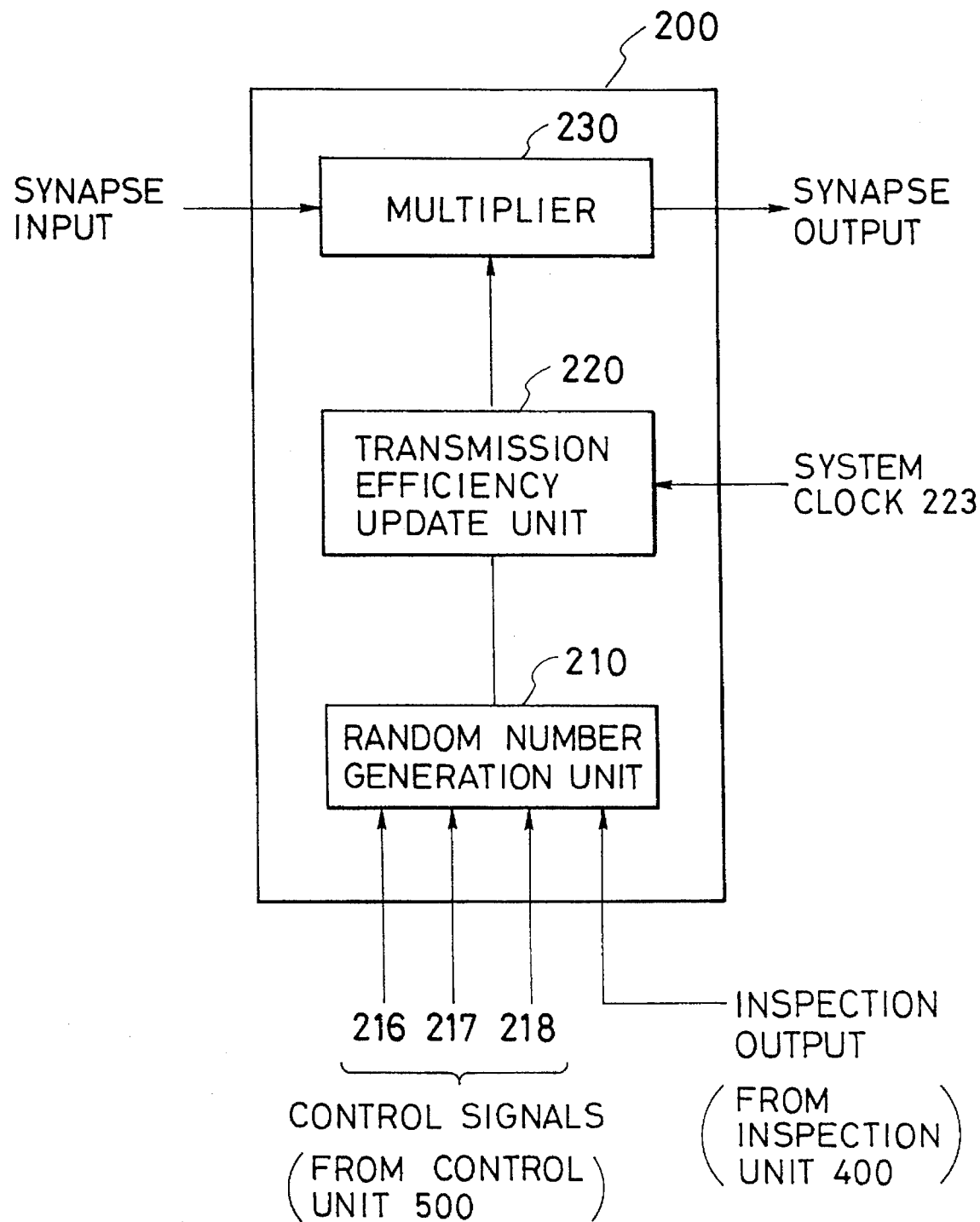
FIG. 6 is a detailed block diagram of a synapse in the neural network device of FIG. 3.

Referring now to FIG. 6, a detailed configuration of the synapse 200 will be described.

As shown in FIG. 6, the synapse 200 further comprises: a random number generation unit 210 for generating an update control signal as a random number according to the inspection output and control signals 216, 217, and 218 supplied from the control unit 500; a transmission efficiency update unit 220 for determining an updated transmission efficiency according to the update control signal supplied from the random number generation unit 210 at a timing given by a system clock 223; and a multiplier 230 for multiplying a synapse input and the updated transmission efficiency determined by the transmission efficiency update unit 220 to obtain a synapse output.

Here, the control unit 500 supplies the same control signals 216, 217, and 218 to all of the synapses 200 of the network 100.

In this configuration of FIG. 6, the transmission efficiency $\omega$ of the synapse 200 can be updated by an amount of either $+\Delta\omega$ or $-\Delta\omega$ in the transmission efficiency update unit 220, according to the update control signal based on the random number which is generated by the random number generation unit 210, in a manner of the Monte-Carlo method.

Figure 7:
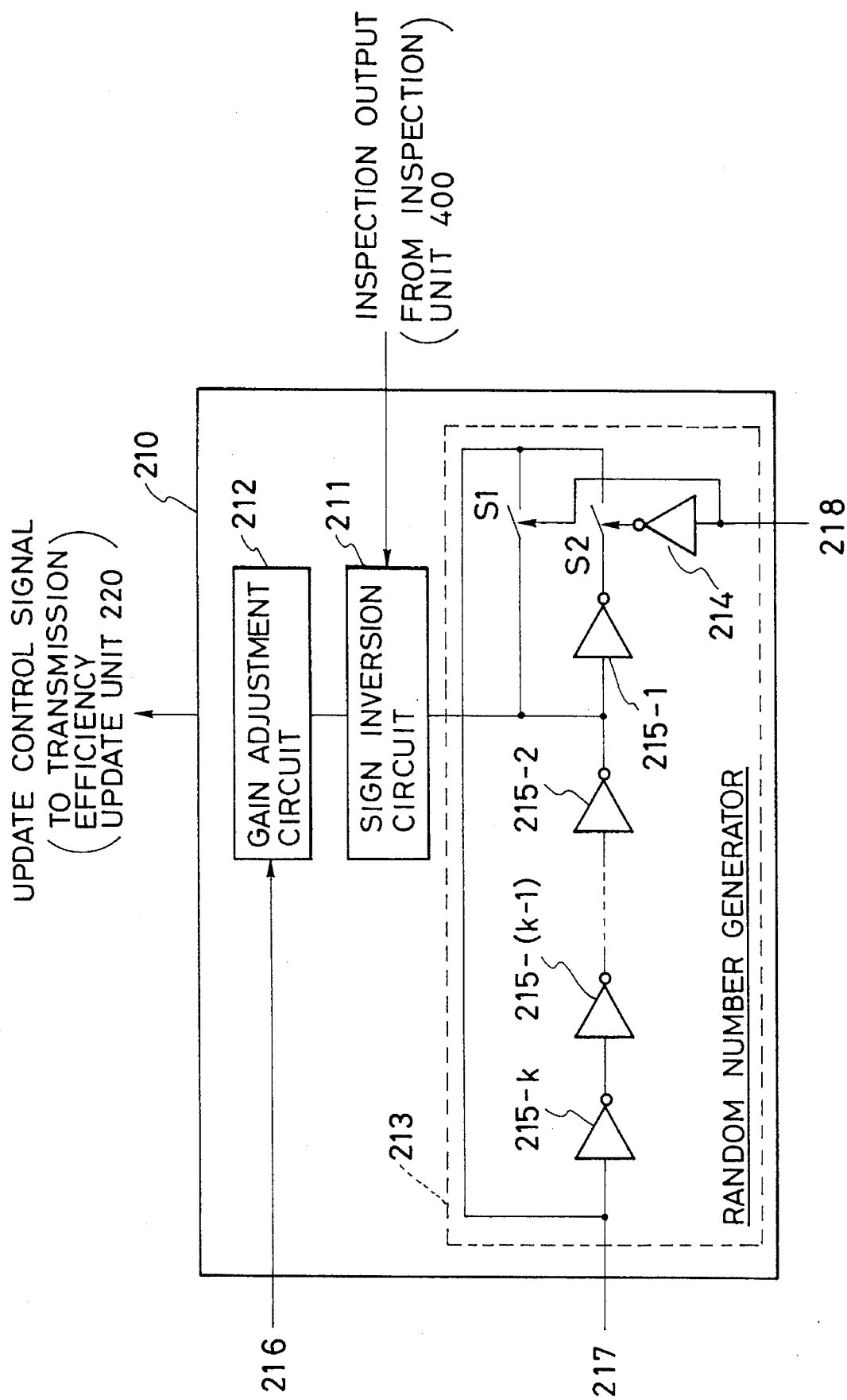
FIG. 7 is a detailed block diagram of a random number generation unit in the synapse of FIG. 6.

Referring now to FIG. 7, a detailed configuration of the random number generation unit 210 will be described.

As shown in FIG. 7, the random number generation unit 210 further comprises: a random number generator 213 for generating a random number according to the control signals 217 and 218; a sign inversion circuit 211 for inverting the sign of the random number generated by the random number generator 213 according to the inspection output supplied from the inspection unit 400; and a gain adjustment circuit 212 for adjusting an input and output gain according to the control signal 216, in order to control the absolute value of the random number outputted from the random number generator 213 through the sign inversion circuit 211, so as to obtain the update control signal to be supplied to the transmission efficiency update unit 220.

In further detail, the random number generator 213 is formed by an odd number of inverters 215-1 to 215-k (k is an odd integer) connected in series, a first switch S1 for selectively connecting an output of a second inverter 215-2 to an input of a last inverter 215-k by bypassing a first inverter 215-1 according to the control signal 218, and a second switch S2 for selectively connecting the output of the first inverter 215-1 to the input of the last inverter 215-k according to an inversion of the control signal 218 obtained by an additional inverter 214. The input of the last inverter 215-k is also supplied with the control signal 217 for initialization. Here, the random number to be generated by this random number generator 213 includes $+\Delta\omega$ and $-\Delta\omega$, which are generated in a random order.

Thus, when the control signal 218 is in ON state, the switch S1 is closed so that the even number of inverters 215-2 to 215-k remains active while the first inverter 215-1 is bypassed, such that the random number outputted to the sign inversion circuit 211 remains the same as the previously generated one. On the other hand, when the control signal is in OFF state, the switch S2 is closed so that the odd number of inverters 215 are active, such that the random number outputted to the sign inversion circuit 211 is a new random number. During generation of a new random number, the output of the update control signal from the random number generation unit 210 is suspended.

The control signal 218 is generated by the control unit 500 according to a random number. In other words, the periods at which the control signal 218 is in ON state is determined according to a random number generated inside the control unit 500.

The sign inversion circuit 211 inverts the sign of the random number supplied from the random number generator 213 when the inspection output supplied from the inspection unit 400 indicates "0" and outputs the sign inverted random number to the gain adjustment circuit 212. This changing of the sign of the random number is incorporated in order to cancel out the previous update due to the previous random number because the inspection output of "0" indicates the increase of the evaluation value E, which is a motion moving away from the minima to be found. Here, however, as a certain number of cases with the increase of the evaluation value E given by the probability p expressed by the equation (11) are allowed to take place as the inspection output is changed from "0" to "1" by the judgement circuit 450 at the probability p, in order to allow the evaluation value to move out from the local minima and to find the absolute minimum.

On the other hand, when the inspection output supplied from the inspection unit 400 indicates "1", the sign inversion circuit 211 leaves the sign of the random number supplied from the random number generator 213 as it is, such that the random number generated by the random number generator 213 is outputted as it is, without changing its sign, to the gain adjustment circuit 212.

The gain adjustment circuit 212 gradually reduce the input and output gain according to the control signal 216, such that the absolute value of the random number $|\Delta\omega|$ is decreased gradually. This adjustment of the input and output gain at the gain adjustment circuit 212 is incorporated in order to speed up the learning process.

Figure 8:
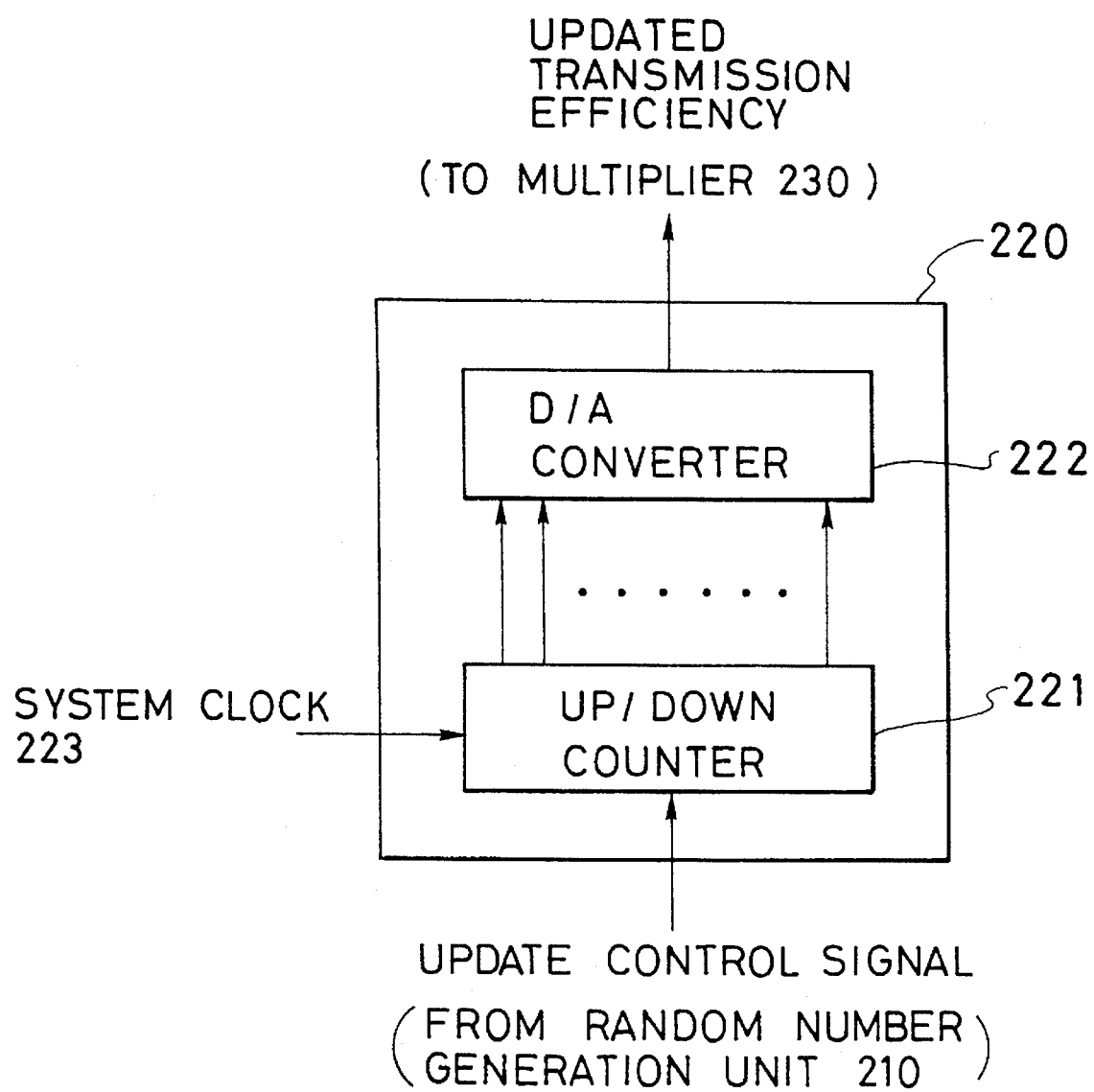
FIG. 8 is a detailed block diagram of a transmission efficiency update unit in the synapse of FIG. 6.

Referring now to FIG. 8, a detailed configuration of the transmission efficiency update unit 220 will be described.

As shown in FIG. 8, the transmission efficiency update unit 220 further comprises: an up/down counter 221 for counting a count value up or down at a timing specified by the system clock 223 according to the sign and the magnitude of the update control signal supplied from the random number generation unit 210; and a D/A converter 222 for D/A converting the count value obtained by the up/down counter 221 and supplying the D/A converted count value as the updated transmission efficiency to the multiplier 230.

Thus, when the update control signal supplied from the random number generation unit 210 is $+\Delta\omega$, the up/down counter counts the count value up by $|\Delta\omega|$, whereas when the update control signal supplied from the random number generation unit 210 is $-\Delta\omega$, the up/down counter counts the count value down by $|\Delta\omega|$.

The D/A converted updated transmission efficiency supplied to the multiplier 230 plays a role of the synapse weight factor to be multiplied with the synapse input to obtain the synapse output.

According to this embodiment, it becomes possible to realize a learning function based on the simulated annealing and the Monte-Carlo method which does not require the very high precision backward propagation of the signals for the learning required in the conventional learning based on the backward error propagation scheme.

As a consequence, the level of the precision required in each neuron and each synapse in order to achieve the effective learning can be reduced considerably, so that the large scale neural network incorporating this learning function can be implemented by using compact and inexpensive circuit elements.

In addition, this learning function based on the simulated annealing and the Monte-Carlo method is applicable to any network configuration in general, including those having the feedback of the synapses or the loop formed by the synapses.

Moreover, this learning function is free of the problem related to the difficulty of finding the absolute minimum by the steepest descent method, so that the reliability of the neural network can be improved according to this embodiment.

It is to be noted that the neural network device of FIG. 3 has been described above in terms of various units for the sake of explanation, but there is no need to implement each of these various units separately, and a part or a whole of the various units involved in this neural network device of FIG. 3 may be implemented in a form of a single neuro-chip in practice.

It is also to be noted that the random number generation at the random number generation unit 210 may not necessarily be totally random, and can be statistically biased to reflect the past effective weight factor (transmission efficiency) update patterns, so as to increases the chance of achieving the effective weight factor update.

It is also to be noted that the neural network device of FIG. 3 may be modified to incorporate the backward propagation of the signals for realizing the learning function based on the backward error propagation scheme, such that the learning process is progressed by using the learning based on the backward error propagation scheme up to a certain level first, prior to the execution of the learning based on the simulated annealing and the Monte-Carlo method according to the present invention, in a case the learning according to the present invention turns out to be rather time consuming.

Figure 9:
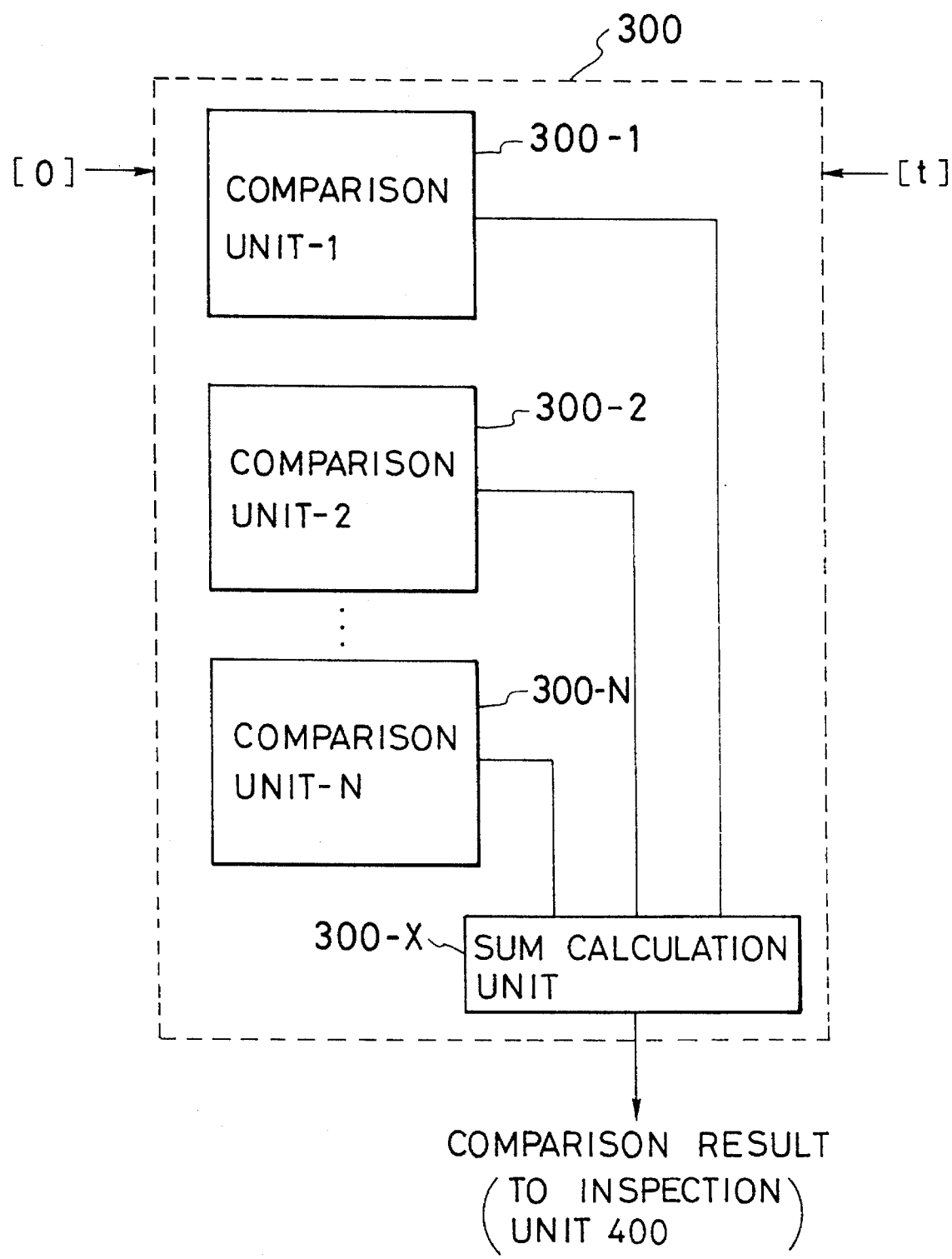
FIG. 9 is a schematic block diagram of a modified configuration of a comparison unit that may be used in the neural network device of FIG. 3.

It is also to be noted that, as shown in FIG. 9, the comparison unit 300 described above may be divided into sub-units (comparison unit-1 300-1 to comparison unit-N 300-N, where N is an integer), each of which is substantially similar to the comparison unit 300 shown in FIG. 4 and the outputs of these sub-units are added together by a summation circuit 300-X. Such a configuration is effective when the number of neuron n involved in the network 100 is very large.

It is also to be noted that the random number generator 213 in the random number generation unit 210 is not necessarily limited to the configuration formed by using the inverters 215 as shown in FIG. 7, and can be replaced by any alternative random number generation circuit.

Figure 10A:
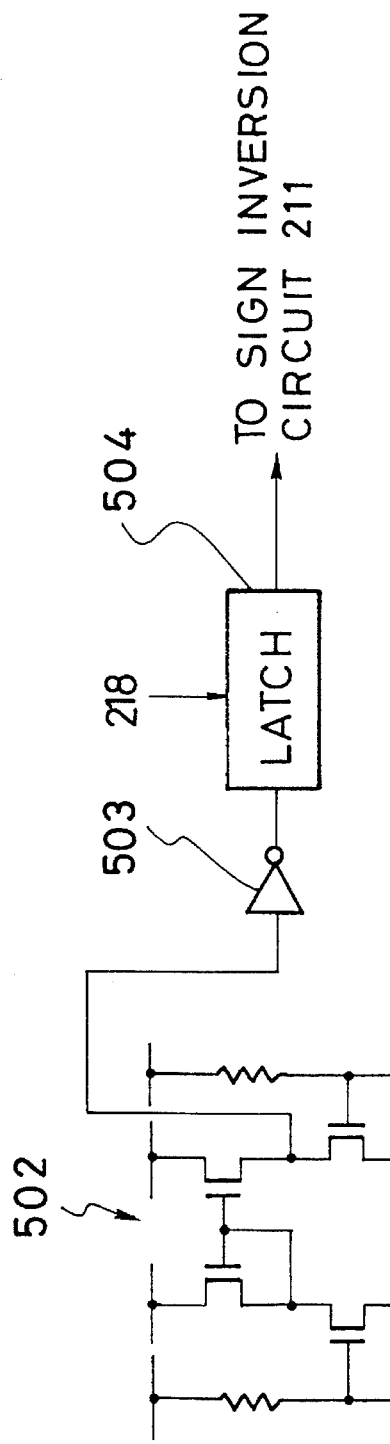
FIG. 10A is a schematic block diagram of an alternative configuration of a random number generator that may be used in the random number generation unit of FIG. 7.

For example, the random number generation circuit utilizing the thermal noise of the circuit element can be formed in a configuration shown in FIG. 10A in which a thermal noise occurring in resistors 501 connected to a differential amplifier 502 is amplified by the differential amplifier 502 and an inverter 503 to obtain the amplified thermal noise in a form of the random number, and then the obtained random number is latched by a latch circuit 504, which outputs the random number at the timing specified by the control signal 218 to the sign conversion circuit 211.

Figure 10B:
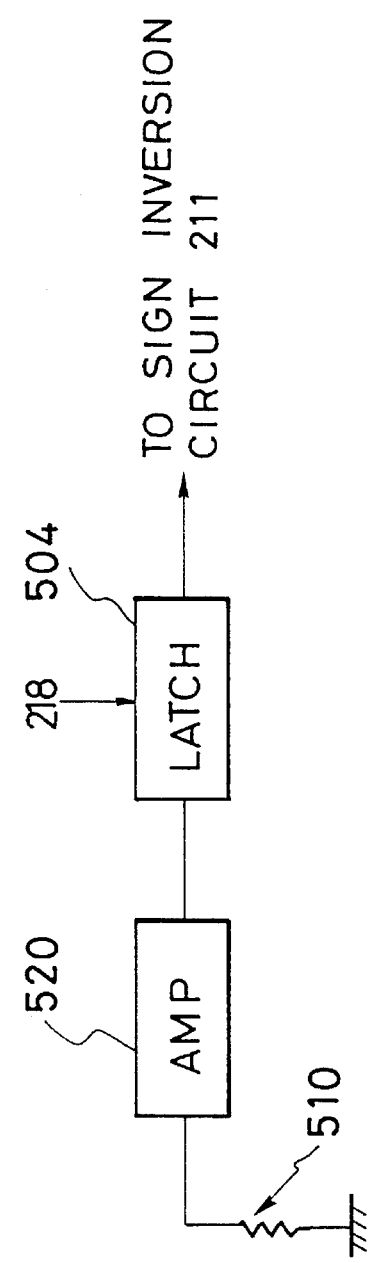
FIG. 10B is a schematic block diagram of an alternative configuration of a random number generator that may be used in the random number generation unit of FIG. 7, which generalizes the configuration shown in FIG. 10A.

It is to be noted that the configuration of FIG. 10A is only an example of this type of the random number generation circuit, and can be generalized to a configuration shown in FIG. 10B, in which a thermal noise occurring in a resistor 510 is amplified by an amplifier 520 to obtain the amplified thermal noise in a form of the random number, and the obtained random number is latched by the latch circuit 504, which outputs the random number at the timing specified by the control signal 218 to the sign conversion circuit 211.

Besides these, many modifications and variations of the above embodiment may be made without departing from the novel and advantageous features of the present invention. Accordingly, all such modifications and variations are intended to be included within the scope of the appended claims.

What is claimed is:

1. A neural network device with a learning function, comprising:

a network formed of a plurality of neurons interconnected by a plurality of synapses, each synapse having a synapse weight factor, said network having a plurality of output signals;

comparison means for calculating an evaluation value according to a difference between each output signal of the network and a corresponding teacher signal; and inspection means for determining a manner of updating the synapse weight factor of said each synapse according to an evaluation value change between a present value and a previous value of the evaluation value calculated by the comparison means;

wherein said each synapse includes:
        random number generation means for generating a randomly changing update control signal according to a random number; and
        synapse weight factor update means for updating a synapse weight factor of said each synapse as a learning with an update value specified by the update control signal generated by the random number generation means in the manner of updating determined by the inspection means.

2. The neural network device of claim 1, wherein the inspection means determines the manner of updating by applying a simulated annealing scheme to the evaluation value calculated by the comparison means.

3. The neural network device of claim 2, wherein the inspection means determines the manner of updating by applying the simulated annealing scheme to the evaluation value, such that the evaluation value change indicating a decrease of the evaluation value is regarded as a need for updating the synapse weight factor, while the evaluation value change indicating an increase of the evaluation value is regarded as a need for cancelling a previous update of the synapse weight factor, except for cases of regarding the evaluation value change indicating the increase of the evaluation value as a need for updating the synapse weight factor occurring at a probability p defined by:

$$p = \exp\left(-\frac{\Delta E}{T}\right)$$

where $\Delta E$ denotes the evaluation value change, and T is "temperature" variable as a function of a discrete time $\tau$ defined by:

$$T(\tau) = \frac{T_0}{1 + \ln(\tau)}$$

where $T_0$ is a prescribed initial value.

4. The neural network device of claim 1, wherein the synapse weight factor update means of said each synapse updates the synapse weight factor of said each synapse according to the Monte-Carlo method.

5. The neural network device of claim 1, wherein the random number generation means further comprises:

an odd number of inverters connected in series for yielding the update control signal, said odd number being greater than 1; and switch means for selectively switching between a state in which an output of a second inverter is connected to an input of a last inverter by bypassing a first inverter and a state in which the output of the first inverter is connected to the input of the last inverter according to a control signal generated according to the random number.

6. The neural network device of claim 1, wherein the random number generation means of all the synapses are controlled according to an identical control signal generated according to the random number.

7. The neural network device of claim 1, wherein the synapse weight factor update means updates the synapse weight factor of said each synapse by an update value proportional to a magnitude of the update control signal generated by the random number generation means, the update value having an identical sign as the update control signal when the manner of updating determined by the inspection means indicates a need for updating the synapse weight factor and the update value having an opposite sign obtained by inverting the sign of the update control signal when the manner of updating determined by the inspection means indicates a need for cancelling a previous update of the synapse weight factor.

8. The neural network device of claim 7, wherein the synapse weight factor update means updates the synapse weight factor of said each synapse by the update value having a proportional rate with respect to the magnitude of the update control signal which is gradually decreasing.

9. The neural network device of claim 1, wherein the random number generation means uses a random number which is statistically biased to reflect past effective weight factor update patters.

10. The neural network device of claim 1, wherein the network further incorporates means for facilitating a learning function based on a backward error propagation scheme.

11. A method of learning in a neural network formed of a plurality of neurons, each of said neurons being connected to one or more other neurons via a plurality of synapses, each synapse having an associated synapse weight factor, said method comprising the steps of:

providing a teacher signal corresponding to output signals of the neural network;

generating an evaluation value signal according to a difference between each of the output signals of the neural network and the corresponding teacher signal;

determining a manner of updating the synapse weight factor of said each synapse according to a change between a present value and a previous value of the evaluation value signal;

generating, in each of said synapses, a randomly changing update control signal according to a random number; and updating the associated synapse weight factor of said each synapse in response to the update control signal generated at the generating step and in the manner of updating determined at the determining step.

12. The method of claim 11, wherein the determining step determines the manner of updating by applying a simulated annealing scheme to the evaluation value signal.

13. The method of claim 12, wherein the determining step determines the manner of updating by applying the simulated annealing scheme to the evaluation value signal, such that the evaluation value signal change indicating a decrease of the evaluation value signal is regarded as a need for updating the synapse weight factor, while the evaluation value signal change indicating an increase of the evaluation value signal is regarded as a need for cancelling a previous update of the synapse weight factor, except for cases of regarding the evaluation value signal change indicating the increase of the evaluation value signal as a need for updating the synapse weight factor occurring at a probability p defined by:

$$p = \exp\left(-\frac{\Delta E}{T}\right)$$

where $\Delta E$ denotes the evaluation value signal change, and T is a "temperature" variable as a function of a discrete time $\tau$ defined by:

$$T(\tau) = \frac{T_0}{1 + \ln(\tau)}$$

where $T_0$ is a prescribed initial value.

14. The method of claim 11, wherein the updating step updates the synapse weight factor of said each synapse according to the Monte-Carlo method.

15. The method of claim 11, wherein the generating step further comprises the steps of:

supplying a control signal generated according to the random number;

connecting an odd number of inverters in series for receiving said control signal and for yielding the update control signal, wherein said odd number is greater than 1; and selectively switching between a state in which an output of a second inverter is connected to an input of a last inverter by bypassing a first inverter and a state in which the output of the first inverter is connected to the input of the last inverter according to the control signal.

16. The method of claim 11, wherein the generating step generates the update control signal for all the synapses according to an identical control signal generated according to the random number.

17. The method of claim 11, wherein the updating step updates the synapse weight factor of said each synapse by the update value proportional to a magnitude of the update control signal generated at the generating step, the update value having an identical sign as the update control signal when the manner of updating determined at the determining step indicates a need for updating the synapse weight factor and the update value having an opposite sign obtained by inverting the sign of the update control signal when the manner of updating determined at the determining step indicates a need for canceling a previous update of the synapse weight factor.

18. The method of claim 17, wherein the updating step updates the synapse weight factor of said each synapse by the update value having a proportional rate with respect to the magnitude of the update control signal which is gradually decreasing.

19. The method of claim 11, further comprising the step of statistically biasing the random number used at the generating step to reflect past effective weight factor update patterns.

20. The method of claim 11, further comprising the step of:

performing a learning based on a backward error propagation scheme to a prescribed level, prior to the learning by the calculating step, determining step, generating step, and the updating step.

* * * * *